UNITED STATES PATENT OFFICE.

FRITZ BENDER, OF MÜHLHEIM-ON-THE-MAIN, GERMANY, ASSIGNOR TO A. LEONHARDT & CO., OF SAME PLACE.

PRODUCTION OF DISULPHO-ACID OF DIAMIDO-STILBENE.

SPECIFICATION forming part of Letters Patent No. 360,553, dated April 5, 1887.

Application filed January 13, 1887. Serial No. 224,254. (Specimens.) Patented in England March 29, 1886, No. 4,387, and in France April 19, 1886, No. 175,630.

*To all whom it may concern:*

Be it known that I, FRITZ BENDER, of Mühlheim-on-the-Main, Grand Duchy of Hesse, in the Empire of Germany, have invented new and useful Improvements in Sulpho-Acids, of which the following is a specification.

My present invention relates to certain improvements in the inventions described by my previous Patents Nos. 350,229 and 350,230; and it consists in the production of disulpho-acid of diamido-stilbene.

Fifty kilos of the soda salt of paranitrotoluolsulpho-acid are dissolved in water and digested with about fifty kilos of a strong caustic lye. When the color of the fluid has become an intensive red one, I add zinc-dust—as much as necessary to render the fluid colorless. I then filtrate it, and precipitate the disulpho-acid of diamido-stilbene by means of muriatic acid. Instead of reducing with zinc-dust in an alkaline solution, I can also reduce the red fluid with protochloride of tin and muriatic acid. The obtained sulpho-acid is purified by dissolving in soda solution and precipitating the filtrate by means of muriatic acid. So manufactured, it forms a yellowish powder which is hardly soluble in water or spirit, but dissolves easily in alkaline fluids, the so-obtained solutions being precipitated by means of acids. The tetrazo body of the new amido sulpho-acid is hardly soluble in water, and when combined with aromatic amines or phenoles renders yellow, red, or violet coloring-matters, which can be fixed on cotton without any mordant.

The tetrazo body when treated with protochloride of tin renders a hydrazine derivative, out of which the nitrogene can be eliminated by boiling with a solution of sulphate of copper. The filtrate contains a disulpho-acid from which stilbene can be obtained by distilling the soda salt of this disulpho-acid with soda lime, (natron kalk.)

Having thus described my invention and the manner of employing the same, what I claim, and desire to secure by Letters Patent of the United States of America, is—

1. The production of disulpho-acid of diamido-stilbene by treating the soda salt of paranitrotoluolsulpho-acid with caustic lye, and reducing the so-obtained red product of condensation with zinc-dust in an alkaline solution or with protochloride of tin in an acid solution.

2. The so-obtained disulpho-acid of diamido-stilbene having the properties that it forms a yellowish powder which is hardly soluble in water or spirit, but dissolves easily in alkaline fluids, the so-obtained solutions being precipitated by means of acids.

In testimony whereof I have signed my name to this specification in the presence of two subscribing witnesses.

FRITZ BENDER.

Witnesses:
    FRANZ HASSLACHER,
    JOSEPH PATRICK.